April 3, 1962  S. R. DUMAS  3,027,939
CURRENCY BUFFER
Filed March 18, 1960
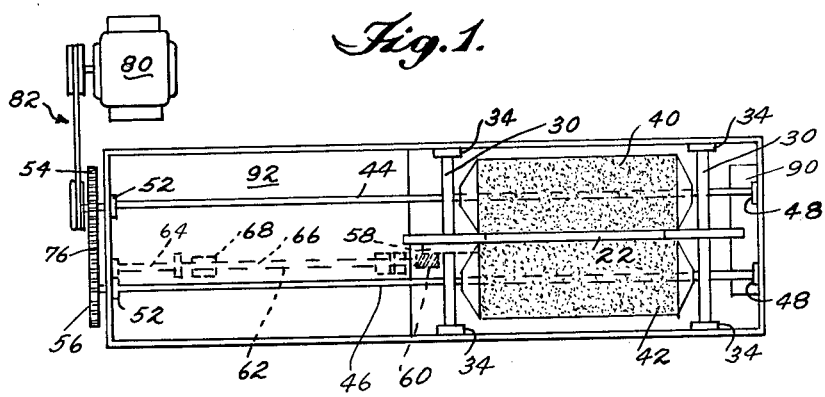
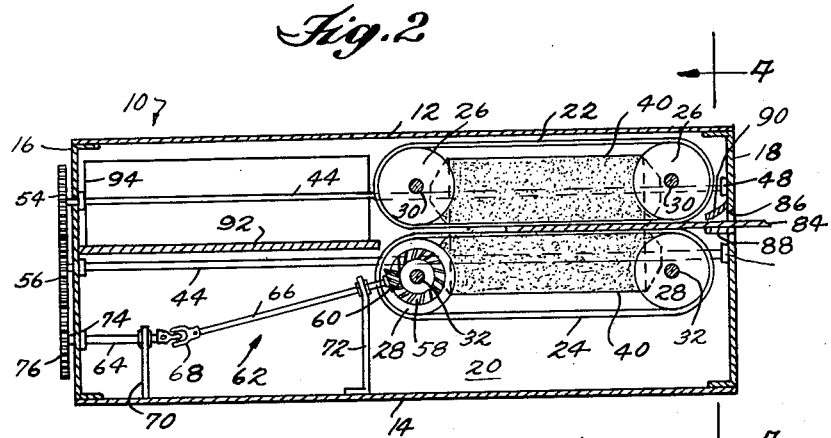
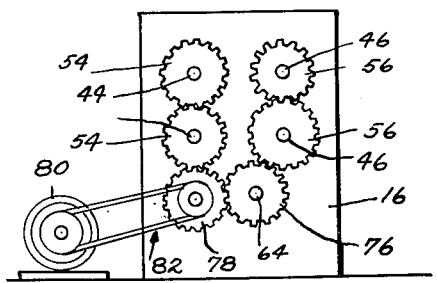
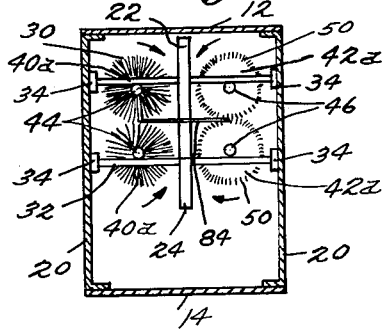
INVENTOR
SAMMY R. DUMAS
BY Cushman, Darby & Cushman
ATTORNEYS ns patent office 3,027,939
Patented Apr. 3, 1962

3,027,939
CURRENCY BUFFER
Sammy R. Dumas, % R. C. Edwards Distributing Co.,
621 S. Washington, El Dorado, Ark.
Filed Mar. 18, 1960, Ser. No. 16,094
5 Claims. (Cl. 162—271)

This invention relates to an apparatus for removing the wrinkles and other surface serrations from short and finite lengths of sheet material, and in particular paper currency.

An apparatus made in accordance with the principles of this invention is particularly adapted to handle short lengths of sheet material, such as U.S. paper currency and the like, although the apparatus will function equally as well upon continuous webs of sheet material. One of the problems of removing wrinkles or transversely stretching short lengths of sheet material is that of positively conveying and gripping the material longitudinally while subjecting it to transverse tensioning forces. This problem has been solved by placing a pair of opposed endless belt conveyers between adjacent pairs of relatively short opposed brush or resilient roll tensioning means in such a manner that the conveyers extend parallel to the bite of the opposed roller pairs. The material to be tensioned is gripped by the endless belt conveyers along its longitudinal axis and is conveyed longitudinally along the transverse tensioning means which are spaced from the conveyer so that the edges of the sheet may be gripped in the bite of each pair of rollers. The rollers are resilient and may assume the form of brushes so that their grip on the material will be firm, but not firm enough to tear it. The spacing of the rolls from the conveyer may vary depending upon the width of the material to be worked upon, and, if desired, one pair of rollers may be dispensed with entirely. In such an apparatus one edge, rather than the center of the material, is gripped by the conveyer and the other edge passed along the bite of one pair of rollers to transversely tension it. The apparatus of this invention is particularly useful to merchants, shopkeepers and others who handle large amounts of paper currency. The condition of the currency handled by such people varies from the range of newly printed currency to currency which has been in circulation for a number of years. In the latter case the currency is rather wrinkled or crumpled and is not easily or conveniently handled. Wrinkled or crumpled currency may be initially semi-flattened by hand so that it may be then fed into an apparatus embodying this invention so that the combined operation of the longitudinal conveyer and transverse tensioning rolls will substantially remove all the wrinkles from the currency so that it will once again become relatively flat and easy to handle.

It is an object, therefore, of this invention to provide an apparatus for removing wrinkles from finite lengths of sheet material.

It is a further object of this invention to provide an apparatus for removing wrinkles from short lengths of sheet material in which the material is positively longitudinally gripped while it is simultaneously being transversely tensioned.

It is a still further object of this invention to provide an improved apparatus for removing wrinkles from sheet material in which the sheet material is longitudinally gripped and longitudinally conveyed along a stationary transverse tensioning means.

These and further objects and advantages will become readily apparent to those skilled in the art upon reading the following detailed description taken in conjunction with the appended drawings in which:

FIGURE 1 is a top plan view of the apparatus of this invention with the top plate removed;

FIGURE 2 is a side elevational view of the apparatus of FIGURE 1, with parts removed for clarity;

FIGURE 3 is an end elevational view taken from the left of FIGURE 2;

FIGURE 4 is a cross-sectional view taken along line 4—4 of FIGURE 2; and

FIGURE 5 is a cross-sectional view of one modification of the endless belt conveyers.

Referring now to the drawing, and particularly to FIGURES 1 and 2, there is shown an exemplary embodiment of this invention comprising a rectangular frame 10 having a top 12 and bottom 14 joined together by forward and rearward end walls 16 and 18 respectively, and side walls 20. A pair of opposed resilient endless belt conveyers 22 and 24 trained about vertically mounted and longitudinally spaced guide wheels 26 and 28, respectively, are mounted on the longitudinal center line of the frame 10 and extend along the rearward half of the frame. The guide wheels 26 and 28 are mounted on horizontal parallel shafts 30 and 32 disposed perpendicularly to the center line of the frame and having their extremities journalled to the side walls 20 by means of suitable antifriction bearings 34. The opposed faces of the endless belts 22 and 24 may be smooth or, if desired, one may have a longitudinal rib or tongue 36 thereon which cooperates with a longitudinal groove 38 in the other, as shown in FIGURE 5.

Two pairs of opposed resilient rolls 40 and 42 are mounted on either side of the endless conveyers 22 and 24 on horizontal parallel and longitudinally extending shafts 44 and 46. The rearward extremity of each of the shafts 44 and 46 is journalled in the rear end wall 18 of the frame 10 by suitable antifriction bearings 48 mounted thereto. The roller shafts 44 and 46 are so aligned that the bite of each pair of opposed rollers 40 and 42 lies in a horizontal plane passing through each roller bite and also the bite of the endless belt conveyers 22 and 24. Each pair of rollers 40 and 42 extends longitudinally and parallel to the endless belt conveyers 22 and 24 and are of slightly shorter length than the distance between the parallel transverse shafts 30 and 32 carrying the endless belt conveyer guide wheels 26 and 28. Preferably, the rollers 40 and 42 are resilient and may take the form of cylindrical brushes 40a made of any suitable material such as nylon, natural fibers, or any other desired material, shown in FIGURE 4 or may be rollers 42a having a sleeve 50 about their periphery, which sleeve may be either smooth or have radially extending bristles of nylon or the like, as also shown in FIGURE 4. The forward ends of each of the roller shafts 44 and 46 extend through bearings 52 mounted on the forward end 16 of the frame 10 and have circular gears 54 and 56 secured to their forward extremity externally of the frame. The gears 54 and 56 are identical, and the respective gears 54 and 56 of adjacent shafts 44 and 46 are in meshed relationship, so that one opposed roller 40 and 42 of each pair rotates in the opposite direction from its associated mate, as shown in FIGURES 3 and 4.

The lower flight 24 of the endless belt conveyers is positively driven and frictionally drives the upper flight 22 in the opposite direction. A bevel gear 58 is secured to the forward guide wheel 28 of the lower flight 24 and is engaged and driven by a cooperating bevel gear 60 secured to the rearward end of a sectional drive shaft 62. The drive shaft sections 64 and 66 are joined together by a suitable universal joint 68 and are each supported by and journalled through aligned vertical supports 70 and 72. The forward end of shaft section 64 extends through a bearing 74 in the frame forward wall 16 and has a circular gear 76 secured at its extremity exteriorly of the frame 10. The gear 76 on the conveyer drive shaft 62 is meshed with the lower gear 56 of one pair of opposed roller shafts 46 and is identical thereto. The conveyer drive shaft gear 76 is also meshed with an identical drive gear 78 journalled in the frame forward wall 10 and meshed with the lower gear 54 of the opposite pair of opposed roller shafts 44. The drive gear 78 may be rotated by a suitable means, such as the electric motor 80 connected thereto by a belt and pulley arrangement 82.

In operation, a finite length of wrinkled sheet material 84, such as United States paper currency, is inserted longitudinally into the rearward end 18 of the frame 10 through a horizontal opening 86 therein, and located in horizontal and longitudinal alignment with the bites of the rollers 40 and 42 and the bite of endless belt conveyers 22 and 24. Suitable guide means, such as a laterally extending flange 88 disposed below the opening 86 and a downward and inwardly curved flange 90 above the opening may be employed to accurately guide the sheet material 84 into the bite of the endless belt conveyers 22 and 24. The sheet of material is then moved longitudinally along the frame 10 between the opposed endless belts 22 and 24, and as the sheet moves longitudinally, its edges move along the bite of each pair of opposed rollers 40 and 42. As the rollers 40 and 42 are oppositely rotating with respect to each other and their associated mate and each outwardly with respect to the endless belt conveyers 22 and 24 at the bite of the rollers, the edges of the sheet material 84 moving longitudinally therealong are gripped in the roller bites so that the sheet is simultaneously transversely tensioned or stretched. As the rollers 40 and 42 have resilient surfaces, the transverse tensioning is sufficient to remove wrinkles from the sheet material 84, but not strong enough to cause it to tear or become deformed. To aid in the wrinkle removing, the device may be placed in a moist atmosphere, or the short lentghs of sheet material may be moistened slightly prior to introduction into the horizontal slot 86. When used to remove wrinkles from paper currency, the rollers 40 and 42 are preferably the same length or slightly longer than the currency so that it may be transversely tensioned its entire length at one time while being positively gripped and conveyed longitudinally by the endless belt conveyers 22 and 24. Obviously, the transverse spacing of the pairs of rollers 40 and 42 may be varied to accommodate different widths of material to be tensioned thereby. The sheet material 84 after moving longitudinally along the bites of rollers 40 and 42 is released from the positive grip of the endless belt conveyers 22 and 24 and is deposited on a horizontal support 92 located between the shafts 44 and 46 in the forward portion of the frame 10. The material may then be removed through a suitable access opening 94 in the frame side walls 20.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

What is claimed is:

1. Apparatus for removing wrinkles from finite lengths of sheet material comprising: a frame; means to grip and convey a finite length of sheet material longitudinally along said frame, said means including a pair of opposed endless belts of a width much less than the width of the sheet material to be straightened; and means to transversely tension a finite length of sheet material while the same is being gripped and conveyed by said belts, said means including a pair of opposed resilient rollers spaced transversely from said belts a distance less than the width of the sheet material to be straightened so that opposite surfaces of the sheet material will be engaged by said rollers, the axes of said rollers extending longitudinally of said frame.

2. The structure of claim 1 in which said rollers comprise cylindrical brushes.

3. The structure of claim 1 in which one of said belts has a longitudinal rib cooperating with a longitudinal groove in the other of said belts.

4. The structure defined in claim 1 further comprising second tensioning means including a second pair of opposed resilient rollers on the opposite side of said belts from said first-mentioned pair of rollers.

5. The structure defined in claim 1 wherein the lengths of the opposed surfaces of said belts and the lengths of said rollers are substantially the same as the length of the sheet of material to be straightened.

References Cited in the file of this patent

UNITED STATES PATENTS

| | | |
|---|---|---|
| 513,642 | Jones | Jan. 30, 1894 |
| 670,518 | Schumacher | Mar. 26, 1901 |
| 1,077,126 | Doughty | Oct. 28, 1913 |
| 1,969,073 | Hamre | Aug. 7, 1934 |
| 2,597,877 | Le Clair | May 27, 1951 |

FOREIGN PATENTS

| | | |
|---|---|---|
| 736,955 | France | Sept. 26, 1932 |